(12) United States Patent
Zhang et al.

(10) Patent No.: US 8,086,908 B2
(45) Date of Patent: Dec. 27, 2011

(54) APPARATUS AND A METHOD FOR REPORTING THE ERROR OF EACH LEVEL OF THE TUNNEL DATA PACKET IN A COMMUNICATION NETWORK

(75) Inventors: Qingshan Zhang, Shanghai (CN); Songwei Ma, Shanghai (CN); Renxiang Yan, Shanghai (CN); Haibo Wen, Shanghai (CN); Fanxiang Bin, Shanghai (CN)

(73) Assignee: Alcatel Lucent, Paris (FR)

( * ) Notice: Subject to any disclaimer, the term of this patent is extended or adjusted under 35 U.S.C. 154(b) by 169 days.

(21) Appl. No.: 12/309,599

(22) PCT Filed: Jul. 3, 2007

(86) PCT No.: PCT/CN2007/002049
§ 371 (c)(1),
(2), (4) Date: Jan. 23, 2009

(87) PCT Pub. No.: WO2008/014666
PCT Pub. Date: Feb. 7, 2008

(65) Prior Publication Data
US 2009/0204850 A1    Aug. 13, 2009

(30) Foreign Application Priority Data

Jul. 24, 2006 (CN) .......................... 2006 1 0029317

(51) Int. Cl.
*G06F 11/00* (2006.01)

(52) U.S. Cl. ............................ 714/48; 714/4.1; 714/47.1
(58) Field of Classification Search .................... 714/48, 714/47, 4.1, 47.1
See application file for complete search history.

(56) References Cited

U.S. PATENT DOCUMENTS

| | | | |
|---|---|---|---|
| 6,816,455 B2 * | 11/2004 | Goldberg et al. | 370/230 |
| 2002/0163920 A1 * | 11/2002 | Walker et al. | 370/401 |
| 2003/0200456 A1 * | 10/2003 | Cyr et al. | 713/200 |
| 2004/0163016 A1 * | 8/2004 | Kim | 714/47 |
| 2006/0036906 A1 * | 2/2006 | Luciani et al. | 714/11 |
| 2007/0088974 A1 * | 4/2007 | Chandwani et al. | 714/6 |

FOREIGN PATENT DOCUMENTS

| | | |
|---|---|---|
| CN | 1585351 | 2/2005 |
| JP | 4361440 | 12/1992 |
| KR | 2003-0097208 | 12/2003 |

* cited by examiner

*Primary Examiner* — Joshua Lohn
*Assistant Examiner* — Sarai Butler
(74) *Attorney, Agent, or Firm* — Harness, Dickey & Pierce

(57) ABSTRACT

The invention provides methods and devices for reporting and parsing the errors of a packet based on IPSec protocol family in a communication network. Concretely, the reserved field in ICMP security failure message is used to denote the error type at the second level of the error in the packet. With the aid of the solution provided by the invention, it is possible to report the error types for a tunnel packet which has an error in detail. And the source termination device can ascertain the error types of a tunnel packet, so as to eliminate the error.

14 Claims, 7 Drawing Sheets

```
0                8                16                               32
+-+-+-+-+-+-+-+-+-+-+-+-+-+-+-+-+-+-+-+-+-+-+-+-+-+-+-+-+-+-+-+-+
|    Type       |     Code      |          Checksum              |
+-+-+-+-+-+-+-+-+-+-+-+-+-+-+-+-+-+-+-+-+-+-+-+-+-+-+-+-+-+-+-+-+
|           Reserved            |          Pointer               |
+-+-+-+-+-+-+-+-+-+-+-+-+-+-+-+-+-+-+-+-+-+-+-+-+-+-+-+-+-+-+-+-+
|                                                                |
~       IP header and the first 64-bit payload                   ~
         of the corresponding tunnel packet
|                                                                |
+-+-+-+-+-+-+-+-+-+-+-+-+-+-+-+-+-+-+-+-+-+-+-+-+-+-+-+-+-+-+-+-+
```

|     Type        |     Code        |           Checksum              |

+-+-+-+-+-+-+-+-+-+-+-+-+-+-+-+-+-+-+-+-+-+-+-+-+-+-+-+-+-+-+-+-+

|   Subcode       |   Reserved      |            Pointer              |

+-+-+-+-+-+-+-+-+-+-+-+-+-+-+-+-+-+-+-+-+-+-+-+-+-+-+-+-+-+-+-+-+

|                                                                     |

~ IP header and the first 64-bit payload of the corresponding tunnel packet ~

|                                                                     |

APPARATUS AND A METHOD FOR REPORTING THE ERROR OF EACH LEVEL OF THE TUNNEL DATA PACKET IN A COMMUNICATION NETWORK

This application is a national phase under 35 U.S.C. 371 of PCT International Application No. PCT/CN2007/002049, filed Jul. 3, 2007, which claims priority on Chinese Application No. 200610029317.3, filed Jul. 24, 2007, the entire contents of both of which are incorporated herein by reference.

TECHNICAL FIELD

The present invention relates to telecommunication network, especially to termination devices and method for, in a telecommunication network, especially IP network, reporting and parsing the errors of packets based on IPSec (Internet Protocols Security) protocol family.

BACKGROUND OF THE INVENTION

IPSec protocol family is a set of network secure access protocols widely-used in IP layer. By using IKE (Internet Key Exchange) protocol, IPSec protocol establishes dedicated a secure communication tunnel between two termination devices for a particular secure communication through negotiation. After that, IP packets belonging to said particular secure communication will be transmitted between the two termination devices at the ends of the tunnel. For conciseness, an IP packet based on IPSec protocol for the communication via secure communication tunnel will be referred to as a tunnel packet, unless otherwise specified.

In particular, after a secure communication tunnel has been established, before forwarding an IP packet belonging to the particular communication, the source termination device, namely the termination device which the corresponding host of the source address of the IP packet corresponds to, should:

1. judging, whether the IP packet belongs to a particular secure communication, i.e. secure communication based IPSec protocol family, according to relevant information such as the destination address and source address of the tunnel packet.

2. if the IP packet belongs to a particular secure communication, performing encryption, encapsulation etc. on the IP packet by using the Security Association (SA) including encryption key and encryption algorithm which is in correspondence with the particular secure communication. Then, the IP packet becomes a tunnel packet.

3. The tunnel packet goes through the Internet via the secure communication tunnel corresponding to said particular secure communication and gets to the destination termination device, namely the termination device which the corresponding host of the source address of the IP packet belongs to.

After receiving the tunnel packet, the destination termination device will, according to the corresponding Security Association, perform decryption etc. on the packet and forward the decrypted packet to the host in correspondence with the destination address of the packet.

In practice, the tunnel packet may have errors for reasons like hack attack, the error of the computer system itself, the mismatch of the encryption and decryption algorithm etc. The errors will fall into 6 categories as below:

(1) wrong SPI (security policy indication);
(2) verification failed;
(3) decapsulation failed;
(4) decryption failed;
(5) verification needed;
(6) authorization needed.

For the convenience in diagnosing and eliminating errors, when a destination termination device finds error(s) in a tunnel packet, it needs to report the corresponding error(s) to the source termination device. According to the error report, the source termination device can be aware of the errors in the packet it has sent and try to get rid of them.

In the prior art, the errors of a tunnel packet are reported by the destination termination device to the source termination device via ICMP (Internet Control Message Protocol) security failure message. However, the existing ICMP security failure message has many drawbacks, i.e.: the granularity of error type reported to source termination device is so large (not quite detailed) that it goes beyond the secure access granularity provided by IPSec protocols family. Hence, once a tunnel packet encounters errors, based on existing error reporting schemes, after the destination termination device sends back the ICMP security failure message, the source termination device can only know the rough error type of the tunnel packet, it is not possible for it to ascertain the error accurately.

Therefore, people need an optimized error reporting solution, which can make the destination termination device report the errors of a tunnel packet accurately, so that it becomes more accurate and convenient for the source termination device to ascertain and diagnose the error.

SUMMARY OF THE INVENTION

The invention is proposed to solve the aforementioned problems in the prior art. According to the minimum granularity of network secure access provided by IPSec protocols family, the six existing kinds of rough errors are further fractionized. And, the fractionized error will be reported to the source termination device together with its parent error.

According to the first aspect of the invention, there is provided a method for, in a termination device (e.g. tunnel server) of a telecommunication network, reporting the errors of a packet based on IPSec protocol family, comprising steps of: receiving a packet from a source termination device; judging whether the packet has an error; if the packet has an error, generating error indicating message which indicates the error types at each level of the error in the packet; sending the error indicating message to said source termination device. Said error types at each level including the error types at the first level and the error types at the second error level, wherein, the error types at the second error level comprising one or more sub-error-type of each error type at the first error level.

According to the second aspect of the invention, there is provided a termination device of a telecommunication network, for reporting the errors of a packet based on IPSec protocol family, comprising: a receiving means, for receiving a packet sent by a source termination device via the Internet; a judging means, for judging whether the packet has an error; a generating means for, if the packet has an error, generating error indicating message which indicates the error types at each level of the error in the packet; a sending means, for sending the error indicating message to said source termination device. Said error types at each level including the error types at the first level and the error types at the second error level, wherein, the error types at the second error level comprising one or more sub-error-type of each error type at the first error level.

According to the third aspect of the invention, there is provided a method for, in a termination device (i.e. tunnel server) of a telecommunication network, parsing an error indicating message based on IPSec protocol family, comprising steps of: receiving the error indicating message which indicates the error types at each level of the error in a packet sent by this termination device to said remote termination device; analyzing to educe, from the error indicating message, the error types at each level of the error in said packet.

According to the forth aspect of the invention, there is provided a termination device (i.e. tunnel server) of a telecommunication network, for parsing an error indicating message based on IPSec protocol family, comprising: a receiving means, for receiving the error indicating message which indicates the error types at each level of the error in a packet sent by this termination device to said remote termination device; an analyzing means, for analyzing to educe, from the error indicating message, the error types at each level of the error in said packet.

With the termination devices and the corresponding methods provided by the invention, it becomes possible to report the error of a tunnel packet in details. Hence, the source termination device can ascertain the error types of a tunnel packet, so as to diagnose and eliminate the error.

BRIEF DESCRIPTION OF THE DRAWINGS

Other features and advantages of the present invention will appear in the following description of non-limiting exemplary embodiments, with reference to the appended drawings.

FIG. 2 illustrates the format of an ICMP security failure message defined in RFC2521 standard;

FIG. 5 illustrates the format of an ICMP security failure message for reporting the error of a tunnel packet concretely, according to an embodiment of the invention;

DETAILED DESCRIPTION OF EMBODIMENTS

According to the present invention, there are two kinds of relationship between termination devices and the hosts:

Case I. The termination devices are separated from the hosts, and work at the two ends of secure communication tunnels as tunnel servers. At this time, a tunnel sever can control the secure communication of one or more hosts, as shown in FIG. 1;

Case II. The termination devices are integrated into the hosts, acting as secure communication controlling means.

At this time, a termination device is mainly responsible for the secure communication of the host which it belongs to. According to need, the terminal device performs relevant process on the IP packets sent by the host to the network card and the ones received by the network card, especially the tunnel packets.

Figure 1:
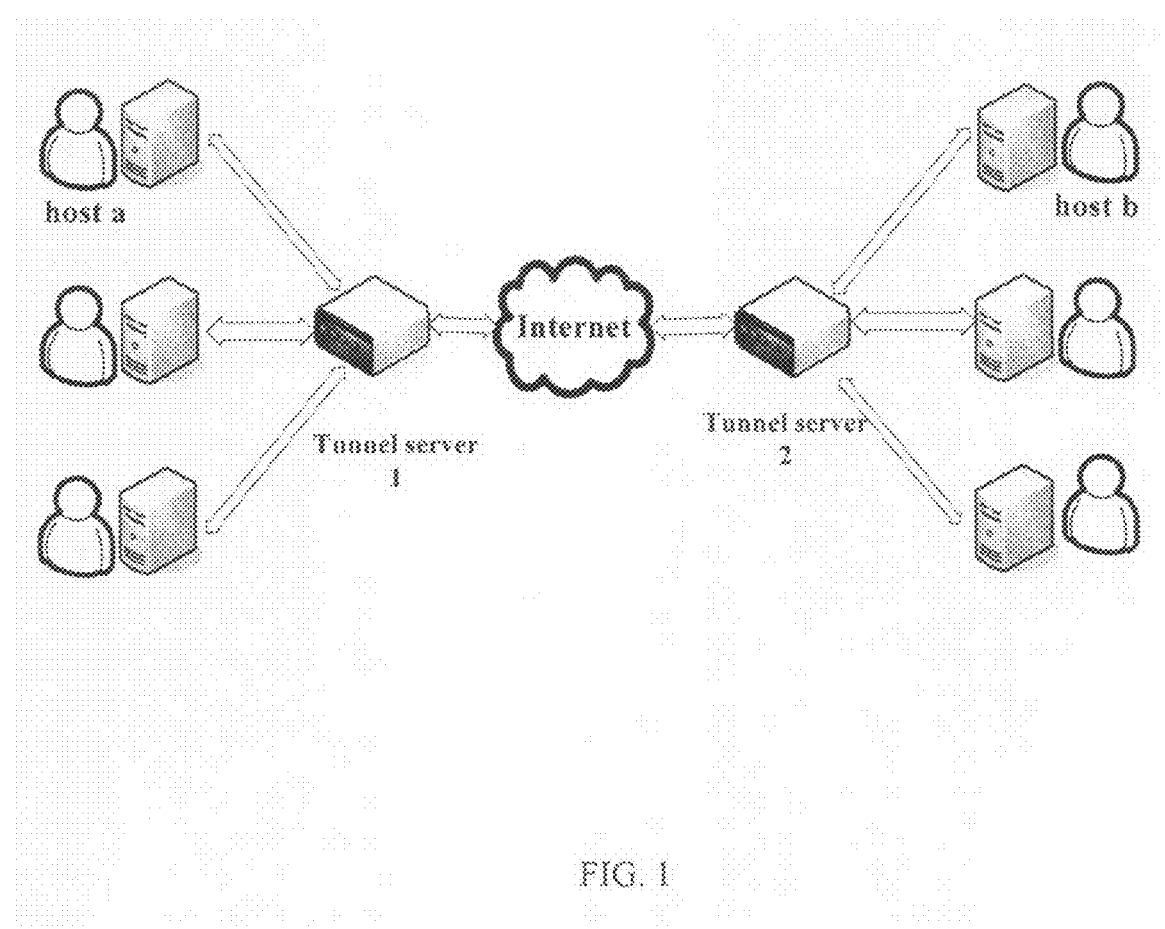
FIG. 1 illustrates the structure of a network based on IPSec protocol family for secure communication via secure communication tunnel.

FIG. 1 illustrates the structure of a network based on IPSec protocol family for secure communication via secure communication tunnel. The network comprises tunnel servers 1 and 2 corresponding to the termination devices in aforesaid Case I, a plurality of hosts under the control of these two tunnel servers, only host a and b out of them are shown in the figure for conciseness. The hosts a and b are performing a specific secure communication based on IPSec protocol family in Internet, via the secure communication tunnel between the two tunnel servers shown in FIG. 1.

Once the secure communication tunnel for the specific secure communication between hosts a and b has been established, hosts a and b can start the secure communication:

The host a sends an IP packet to the host b. Obviously, this packet belongs to the specific secure communication, and needs to be processed based on IPSec protocol family and then gets through the Internet as a tunnel packet.

The IP packet sent out by the host a will arrive at tunnel server 1 shown in the figure first. According to the "destination address-source address" pair of the IP packet, tunnel server 1 can determine that the packet belongs to the specific secure communication between host a and host b. Thus, tunnel server 1 performs processes, such as encryption, encapsulation etc., on the packet based on corresponding Security Association. Then the IP packet becomes a tunnel packet which can go through the Internet in security. For this tunnel packet, tunnel server 1 is the source termination device.

Since the destination host i.e. host b is under the control of tunnel server 2, the tunnel packet will arrive at tunnel server 2 via the secure communication tunnel between tunnel server 1 and 2 belonging to the specific secure communication between host a and host b. For this tunnel packet, tunnel server 2 is the destination termination device.

Based on the technical solution provided by the present invention, after tunnel server 2 receives said tunnel packet from tunnel server 1, it will judge whether the packet has an error, and report the error in the packet concretely with error indicating message, e.g. ICMP security failure message, to tunnel server 1 via said secure communication tunnel.

It can be easily understood that, for the termination device in aforesaid Case II, tunnel server 1 and tunnel server 2 shown in FIG. 1 will be located in host a and host b respectively to control the secure communication of the hosts. Other hosts which need secure communication based on IPSec will also be configured to have their own termination devices. Wherein, the process performed on the packet is the same as that in Case I, no more unnecessary details. For conciseness, the description hereunder will mainly focus on Case I.

Being different from the prior art, the method for reporting the error in a tunnel packet provided by the present invention makes some improvements on the existing ICMP security failure message. FIG. 2 illustrates the format of an ICMP security failure message defined in RFC2521 standard for reporting the error in a tunnel packet based on IPSec protocol family.

From the figure, it can be seen that, an existing ICMP security failure message comprises 6 fields as:

Type, taking 40 as its value, denoting that the message is an ICMP security failure message;

Code, denoting the error type of the tunnel packet. As mentioned before, an existing ICMP security failure message only uses Code field for the error report, the errors are not fractionized well, and the granularity of error type is pretty large. Wherein, the values taken by the Code field and the corresponding error types (i.e., error types at the first level) are as follows, 0: wrong SPI (security policy indication); 1: verification failed; 2: decapsulation failed; 3: decryption failed; 4: verification needed; 5: authorization needed. Obviously, when an existing ICMP security message from a source termination device gets to the destination termination device, the source termination device can ascertain the error in the tunnel packet only to the extent described by the 6 types above.

Checksum, the checksum of the ICMP security failure message;

Reserved, in an existing ICMP security failure message, this field is set to '0';

Pointer, the offset position in the IP header of the tunnel packet in correspondence with the ICMP security failure message of the SPI. If there is no SPI, this field should be set to '0'.

the IP header of the tunnel packet in correspondence with the ICMP security failure message, and the first 64-bit payload.

By using the aforesaid ICMP security failure message as the error indicating message of a tunnel packet, the report granularity of the error in a tunnel packet will be restricted, the source termination device can not ascertain the exact type of the error accurately. And this is undesired for people to solve the problem.

Figure 3:
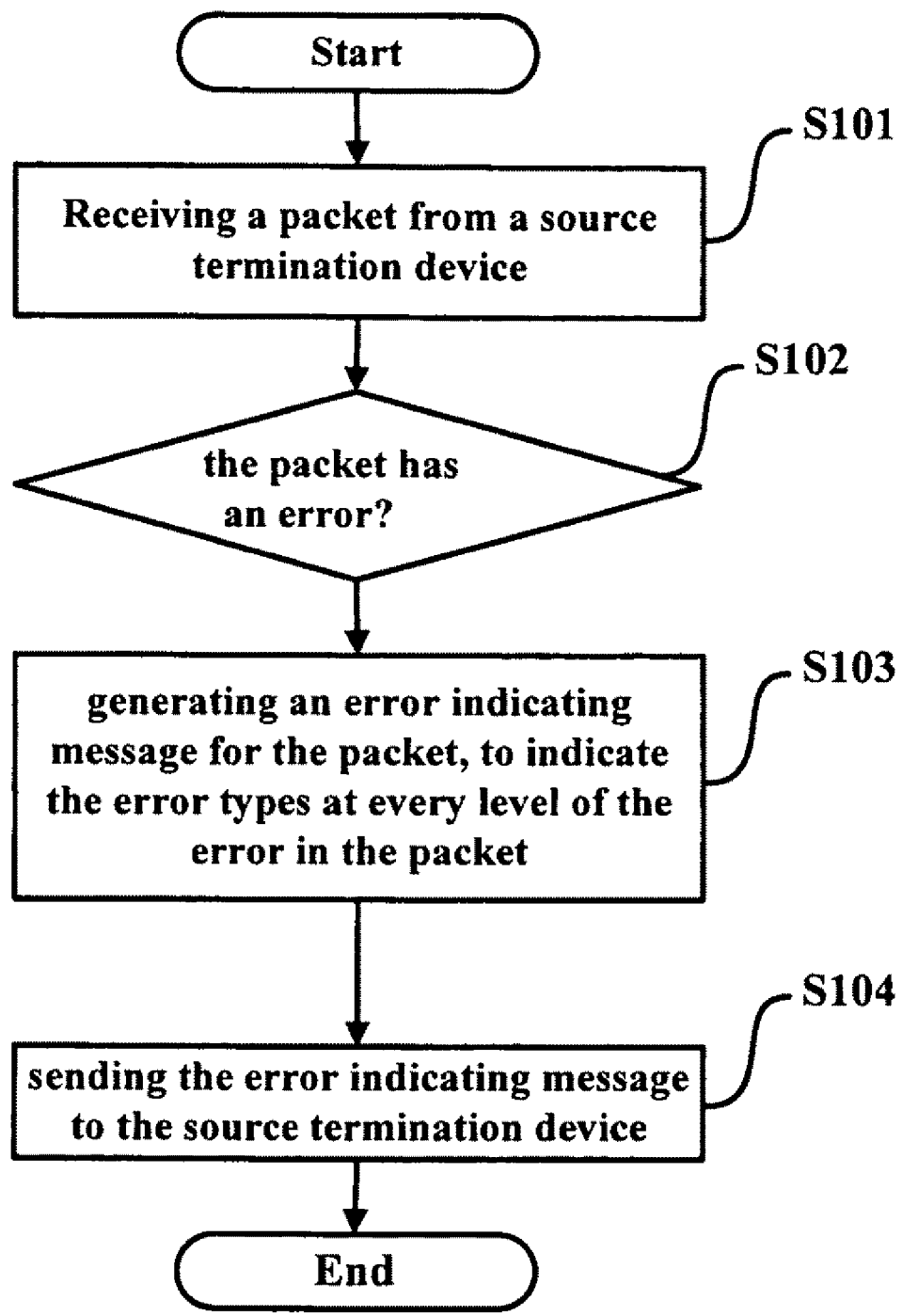
FIG. 3 is the flow chart of a method for, in a termination device of a telecommunication network, for reporting the errors of a packet based on IPSec protocol family, according to an embodiment of the invention.

FIG. 3 is the flow chart of a method for, in a termination device of a telecommunication network, reporting the errors of a packet based on IPSec protocol family, according to an embodiment of the invention. Description of the method will be made hereunder with reference to FIG. 3 in conjunction with FIG. 1 and FIG. 5. Wherein, FIG. 5 illustrates the format of an ICMP security failure message for reporting the error of a tunnel packet concisely, according to an embodiment of the invention. The method starts with step S101.

In step S101, tunnel server 2 receives a tunnel packet from tunnel server 2 for the specific secure communication between host a and host b. This tunnel packet may have some errors, the method enters step S102.

In step S102, the received packet will be tested so as to judge if there is any error in it. E.g., the type error at the first level in correspondence with the Code field taking 5 as its value, the present invention has defined 6 sub-error-type for this error type at the first level (namely error types at the second level are subject to this error type at the first level), denoted by the Subcode field (belongs to the Reserved field in existing ICMP security failure message) in the ICMP security failure message shown in FIG. 5. In this embodiment, the Subcode field has 8 bits, while the Reserved field in existing ICMP security failure message has 16 bits in total, hence, the 8 bits left can still be set as '0'.

When the Code field takes value as '5', i.e. the error type at the first level is 'authorization needed', the values that may be taken by the Subcode field and the meanings thereof are as below:

0: the system has not recognized the sub-error-type;
1: the name has not been authorized;
2: the data sensitivity level has not been authorized;
3. the transmission layer has not been authorized;
4. the source port has not been authorized;
5. the destination port has not been authorized.

It is easy to understand that, when the Subcode field takes the value as 1 to 5, it will correspond to five sub-error-types of 'authorization needed' which is an error type at the first level. Having received the ICMP security failure message, tunnel server 1 can ascertain the exact error type of the error in the tunnel packet sent by tunnel server 1 to tunnel server 2.

Particularly, the present invention has defined a value '0' that can also be taken by the Subcode field. This is because in the existing RFC 2521 standard, the Reserved field consists of 16 bits of '0', when tunnel server 2 reports the error in a tunnel packet according to the this existing standard, i.e. do not report the error types at the second level, the Code field of the ICMP security failure message sent to tunnel server 1 will denote the error types at the first level, while both of the Subcode field and the Reserved field shown in FIG. 5 will be 8 bits of '0'. Hence, this ICMP security failure message has the same format as that of the message based on the existing RFC2521 standard, so that it is compatible with the existing standard.

When the message arrives at tunnel server 1, tunnel server 1 can get information as below according to the message: the tunnel packet in correspondence with this ICMP security failure message has an error corresponding to Code field taking 5 as its value, namely 'authorization needed'. The concrete error level at the second level is still unknown.

It should be understood that, in the present invention, the field used in ICMP security failure message to indicate the error type at the second level of the error in the packet is not limited to 'Subcode' field as mentioned above. What's more, it is also not limited to the 'Reserved' field in existing ICMP security failure message as shown in FIG. 2. In practice, any proper field in ICMP security failure message can be chosen to realize the aforesaid function according to need.

In particular, for the circumstance in which the value of the Code field is '5', tunnel server 2 acting as the destination termination device determines the way of assigning values to the Subcode field in ICMP security failure message with the procedures as below:

I. If tunnel server 2 adopts the solution in existing standard to report the error type of the tunnel packet, then according to the definition in RFC2521, the method proceeds into S103, so as to generate an ICMP security failure message for the tunnel packet with an error. Wherein, the Subcode field of the message takes '0' as its value.

II. After performing correct decapsulation on the tunnel packet from tunnel server 1, tunnel server 2 judges whether the name in the payload of the decapsulated IP packet is in conformity with the selector in SA. If not, the method will enter step S103, an ICMP security failure message will then be generated for that packet. Wherein, the Subcode field takes '1' as its value.

Wherein, there are two protocols for packet encapsulation: AH and ESP. As to a tunnel packet encapsulated based on AH protocol, before the decapsulation, the payload of the packet is plain text without encryption. After the decapsulation, checking the data integrity of the packet is enough. As to a tunnel packet encapsulated based on ESP protocol, before the decapsulation, the payload of the packet is cipher text. Hence, after the decapsulation, besides checking the data integrity, decrypting the payload of the packet is also necessary.

III. After decapsulating the tunnel packet from tunnel server 1 correctly, tunnel server 2 judges whether the data sensitivity level in the payload of the IP packet is in conformity with the selector in SA. If not, the method enters step S103, an ICMP security failure message is generated for said packet. Wherein, the Subcode field takes '2' as its value.

IV. After decapsulating the tunnel packet from tunnel server 1 correctly, tunnel server 2 judges whether the transmission layer protocol in the payload of the IP packet is in conformity with the selector in SA. If not, the method enters step S103, an ICMP security failure message is generated for said packet. Wherein, the Subcode field takes '3' as its value.

V. After decapsulating the tunnel packet from tunnel server 1 correctly, tunnel server 2 judges whether the source port in the payload of the IP packet is in conformity with the selector in SA. If not, the method enters step S103, an ICMP security failure message is generated for said packet. Wherein, the Subcode field takes '4' as its value.

VI. After decapsulating the tunnel packet from tunnel server 1 correctly, tunnel server 2 judges whether the destination port in the payload of the IP packet is in conformity with the selector in SA. If not, the method enters step S103, an ICMP security failure message is generated for said packet. Wherein, the Subcode field takes '5' as its value.

After generating the ICMP security failure message for the tunnel packet with an error in step S103, the method goes into step S104. In step S104, tunnel server 2 sends the ICMP security failure message to tunnel server 1. Based on the indication of the ICMP security failure message, tunnel server 1 will be aware of the concrete error type of the tunnel packet it sent before.

Figure 4:
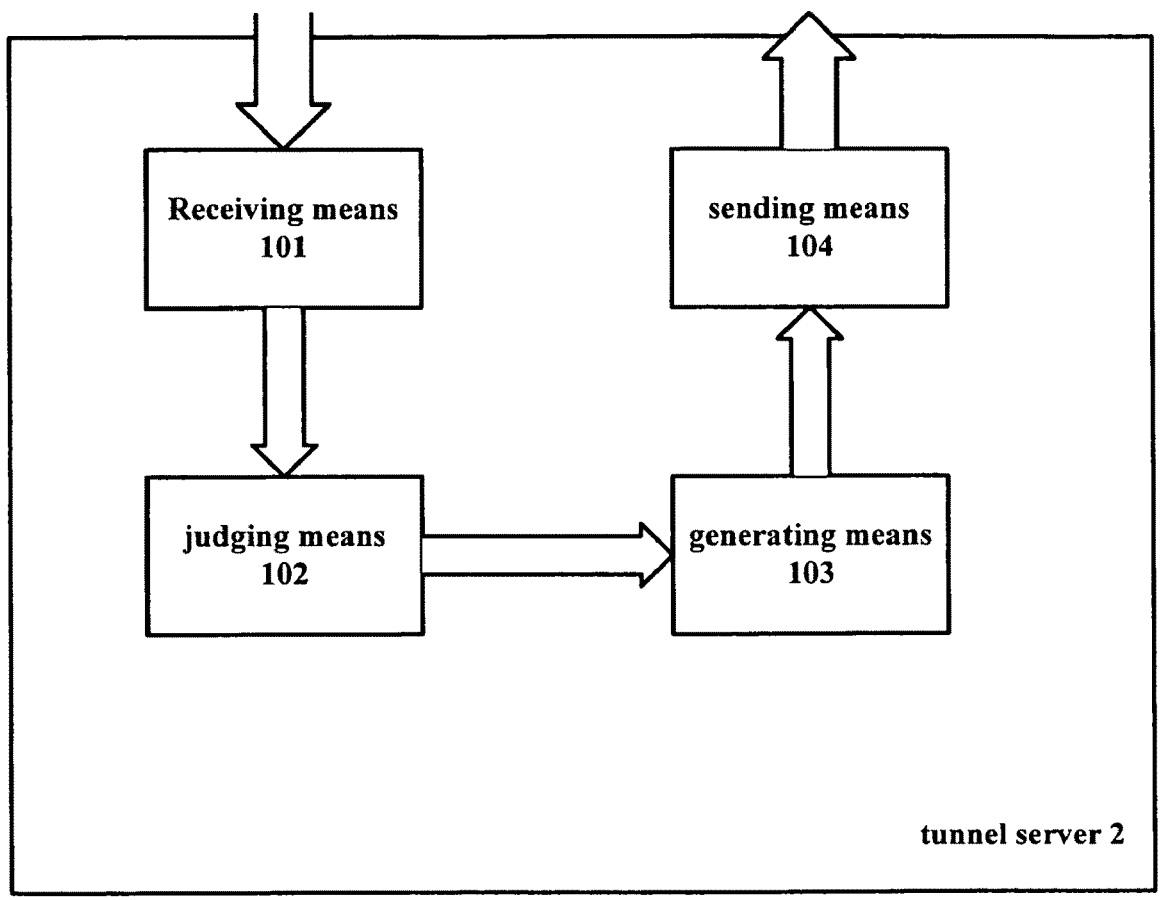
FIG. 4 is a block diagram of a tunnel server in a telecommunication network, for reporting the errors of a packet based on IPSec protocol family, according to an embodiment of the invention.

FIG. 4 is a block diagram of a tunnel server in a telecommunication network, for reporting the errors of a packet based on IPSec protocol family, according to an embodiment of the invention. Hereinafter, it will be described with reference to FIG. 4 in conjunction with FIG. 1 and FIG. 5. The tunnel server 2 working as a source termination device in FIG. 1 comprises: a receiving means 101, a judging means 102, a generating means 103 and a sending means 104.

When a tunnel packet from the source termination device (tunnel server 1) for the specific secure communication between host a and host b arrives, it will be received by the receiving means 101. This tunnel packet may have some errors, and will be forwarded by the receiving means 101 to the judging means 102.

Then, the received packet will be tested by the judging means 102 so as to judge if there is any error. E.g., the type error at the first level in correspondence with the Code field taking 5 as the value, the present invention has defined 6 sub-error-type for this error type at the first level, namely error types at the second level are subject to this error type at the first level, denoted by the Subcode field (belongs to the Reserved field in existing ICMP security failure message) in the ICMP security failure message shown in FIG. 5. In this embodiment, the Subcode field has 8 bits, while the Reserved field in existing ICMP security failure message has 16 bits in total, hence, the 8 bits left can still be set as '0'.

When the Code field takes value as '5', i.e. the error type at the first level is 'authorization needed', the values that may be taken by the Subcode field and the meanings thereof are as below: 0: the system has not recognized the sub-error-type; 1: the name has not been authorized; 2: the data sensitivity level has not been authorized; 3. the transmission layer has not been authorized; 4. the source port has not been authorized; 5. the destination port has not been authorized.

It is easy to understand that, when the Subcode field takes the value as 1 to 5, it will correspond to five sub-error-types of 'authorization needed' which is an error type at the first level. Having received the ICMP security failure message, tunnel server 1 can ascertain the exact error type of the error in the tunnel packet sent by tunnel server 1 to tunnel server 2.

Particularly, the present invention has defined a value '0' that can also be taken by the Subcode field. This is because in the existing RFC 2521 standard, the Reserved field consists of 16 bits of '0', when tunnel server 2 reports the error in a tunnel packet according to the existing standard, i.e. do not report the error types at the second level, the Code field of the ICMP security failure message sent by the sending means 104 to tunnel server 1 will also denote the error types at the first level, while both of the Subcode field and the Reserved field shown in FIG. 5 will be 8 bits of '0'. Hence, this ICMP security failure message has the same format as that of the message based on the existing RFC2521 standard, so as it is compatible with the existing standard.

When the message arrives at tunnel server 1, tunnel server 1 can get information as below according to the message: the tunnel packet in correspondence with this ICMP security failure message has an error corresponding to Code field taking 5 as its value, namely 'authorization needed'. The concrete error level at the second level is still unknown.

It should be understood that, in the present invention, the field used in ICMP security failure message to indicate the error type at the second level of the error in the packet is not limited to 'Subcode' field as mentioned above. What's more, it is also not limited to the 'Reserved' field in existing ICMP security failure message as shown in FIG. 2. In practice, any proper field in ICMP security failure message can be chosen to realize the aforesaid function according to need.

In particular, for the circumstance in which the value of the Code field is '5', tunnel server 2 acting as the destination termination device determines the way of assigning values to the Subcode field in ICMP security failure message with the procedures as below:

I. If tunnel server 2 adopts the solution in existing standard to report the error type of the tunnel packet, then according to the definition in RFC2521, the generating means 103 will generate an ICMP security failure message for the tunnel packet which has an error. Wherein, the Subcode field of the message takes '0' as its value.

II. After performing correct decapsulation on the tunnel packet from tunnel server 1, the judging means 102 will judge whether the name in the payload of the decapsulated IP packet is in conformity with the selector in SA. If not, the generating means 103 will generate an ICMP security failure message for the tunnel packet which has an error. Wherein, the Subcode field takes '1' as its value.

Wherein, there are two protocols for packet encapsulation: AH and ESP. As to a tunnel packet encapsulated based on AH protocol, before the decapsulation, the payload of the packet is plain text without encryption. After the decapsulation, checking the data integrality of the packet is enough. As to a tunnel packet encapsulated based on ESP protocol, before the decapsulation, the payload of the packet is cipher text. Hence, after the decapsulation, besides checking the data integrality, decrypting the payload of the packet is also necessary.

III. After decapsulating the tunnel packet from tunnel server 1 correctly, the judging means 102 will judge whether the data sensitivity level in the payload of the IP packet is in conformity with the selector in SA. If not, the generating means 103 will generate an ICMP security failure message for the tunnel packet which has an error. Wherein, the Subcode field takes '2' as its value.

IV. After decapsulating the tunnel packet from tunnel server 1 correctly, tunnel server 2 judges whether the transmission layer protocol in the payload of the IP packet is in conformity with the selector in SA. If not, the generating means 103 will generate an ICMP security failure message for the tunnel packet which has an error. Wherein, the Subcode field takes '3' as its value.

V. After decapsulating the tunnel packet from tunnel server 1 correctly, tunnel server 2 judges whether the source port in the payload of the IP packet is in conformity with the selector in SA. If not, the generating means 103 will generate an ICMP security failure message for the tunnel packet which has an error. Wherein, the Subcode field takes '4' as its value.

VI. After decapsulating the tunnel packet from tunnel server 1 correctly, tunnel server 2 judges whether the destination port in the payload of the IP packet is in conformity with the selector in SA. If not, the generating means 103 will generate an ICMP security failure message for the tunnel packet which has an error. Wherein, the Subcode field takes '5' as its value.

After generating the ICMP security failure message for the tunnel packet which has an error, the generating means 103 will forward the message to the sending means 104. Then, the sending means 104 sends the ICMP security failure message to tunnel server 1. Based on the indication of the ICMP security failure message, tunnel server 1 will be aware of the concrete error type of the tunnel packet it sent before.

To make tunnel server 2 working as the destination termination server ascertain, according to the received error indicating message (e.g. ICMP security failure message) from tunnel server 1, the error types at each level of the tunnel packet which has an error correctly, the present invention has provided a method for, in a termination device of a telecommunication network, parsing an error indicating message based on IPSec protocol family.

Figure 6:
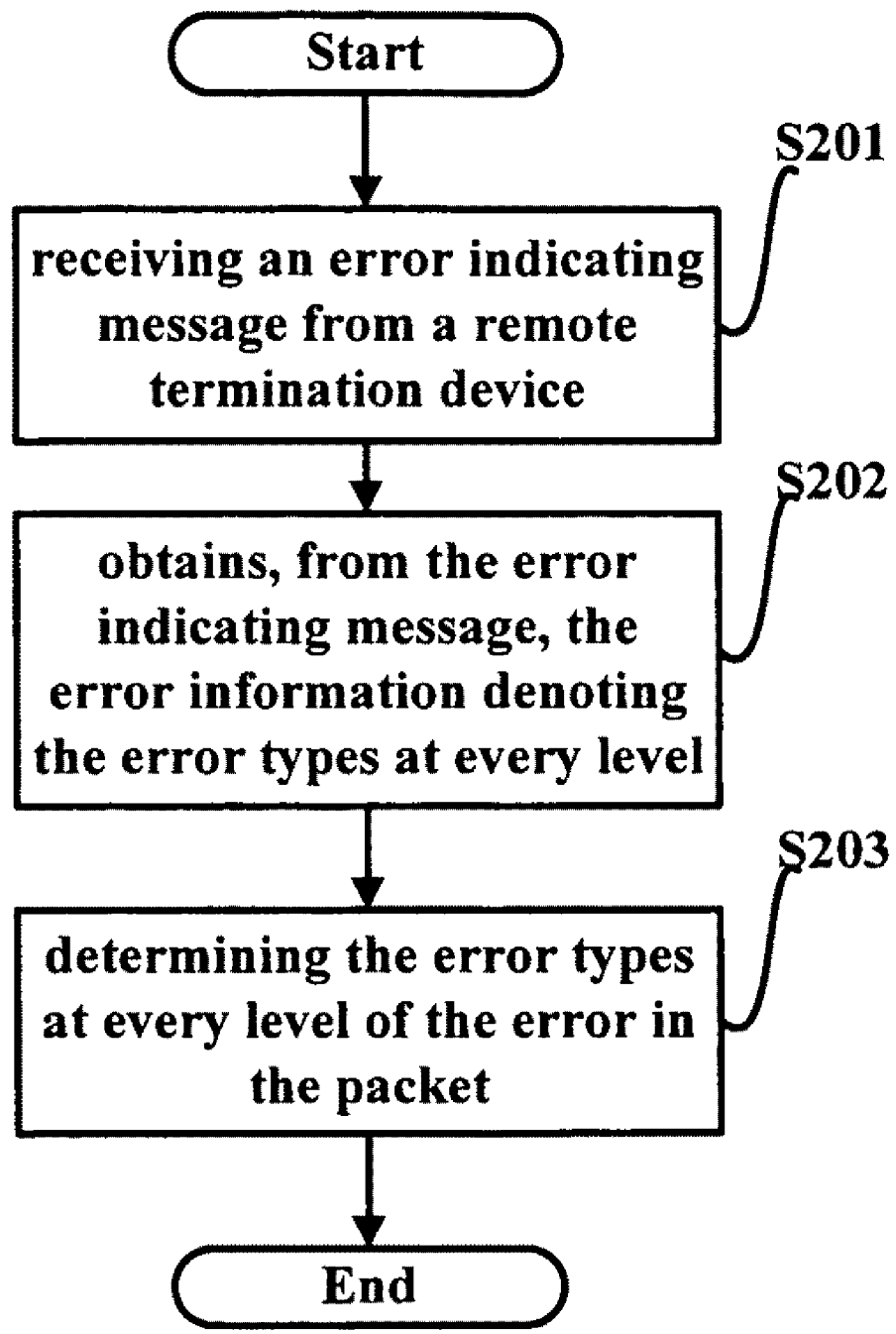
FIG. 6 is the flow chart of a method for, in a termination device of a telecommunication network, parsing an error indicating message based on IPSec protocol family, according to an embodiment of the invention.

FIG. 6 is the flow chart of a method for, in a termination device of a telecommunication network, parsing an error indicating message based on IPSec protocol family, according to an embodiment of the invention. The method will be described with reference to FIG. 6 in conjunction with FIG. 1 and FIG. 5. The method starts with step S201.

In step S201, tunnel server 1 receives an error indicating message (e.g. ICMP security failure message) sent by tunnel server 2 via a secure communication tunnel. Without loss of generality, suppose the Code field of the ICMP security failure message takes '5' as the value, and the Subcode field therein takes '1'. After the ICMP security failure message has been received, the method enters into step S202.

In step S202, tunnel server 1 obtains, from the error indicating message indicating the error types at each level of the tunnel packet, error information denoting the error types at every level. Particularly, in this embodiment, tunnel server 1 obtains, respectively from the Code field and Subcode field of the ICMP security failure message from tunnel server 2, the error information '5' standing for the error type at the first level and the error information '1' standing for the error type at the second level. Then, the method enters into step S203.

In step S203, by comparing the error information obtained in step S202 with a local stored error list comprising the mapping of error information and the concrete error types, tunnel server 1 determines the error types at each level of said tunnel packet which has an error. In particular, it can be done in the way below:

by comparing the '5' obtained in the Code field with the Code-field part of the error list, it can be determined that the error type at the first level of the error in said tunnel packet is 'authorization needed'.

by comparing the '1' obtained in the Subcode field with the Subcode-field part of the error list (the error information '5' obtained from the Code field as described above can also be used in conjunction with it), it can be determined that the error type at the second level is "the name in the payload of the decapsulated IP packet is not in conformity with the selector in SA".

Figure 7:
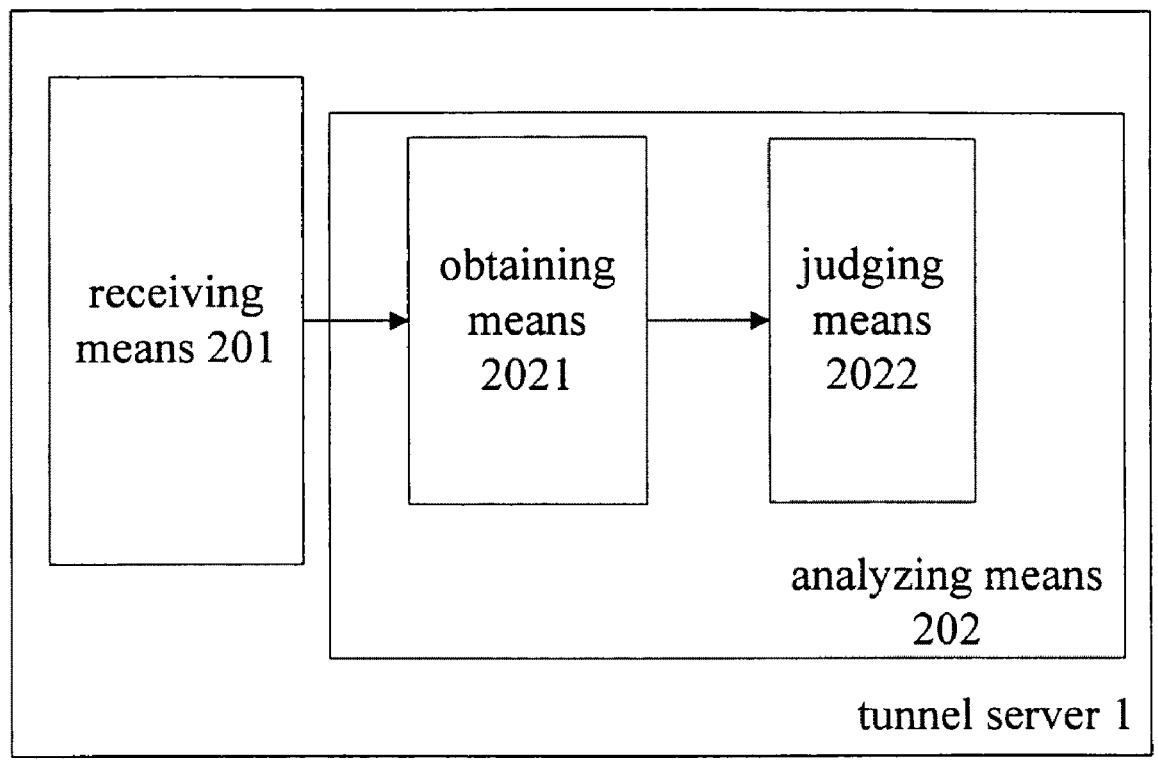
FIG. 7 is a block diagram of a tunnel server of a telecommunication network, for parsing an error indicating message based on IPSec protocol family, according to an embodiment of the invention.

FIG. 7 is a block diagram of a tunnel server of a telecommunication network, for parsing an error indicating message based on IPSec protocol family, according to an embodiment of the invention. The tunnel server (e.g. tunnel server 1 shown in FIG. 1) will be described with reference to FIG. 7 and in conjunction with FIG. 1 and FIG. 5. The tunnel server comprises a receiving means 201 and an analyzing means 202, the analyzing means 202 further comprises an obtaining means 2021 and a judging means 2022.

When an error indicating message (e.g. ICMP security failure message) sent by tunnel server 2 via a secure communication tunnel arrives at tunnel server 1, it will be received by the receiving means 201. Without loss of generality, suppose the Code field of the ICMP security failure message takes '5' as its value, and the Subcode field therein takes '1'. After the ICMP security failure message has been received, the receiving means 201 forward it to the obtaining means 2021.

Then, the obtaining means 2021 obtains, from the error indicating message indicating the error types at each level of the tunnel packet, error information denoting the error types at every level. Particularly, in this embodiment, tunnel server 1 obtains, respectively from the Code field and Subcode field of the ICMP security failure message from tunnel server 2, the error information '5' standing for the error type at the first level and the error information '1' standing for the error type at the second level. The obtained error information will be forwarded to the judging means 2022.

By comparing the error information obtained by the obtaining means 2021 with a local stored error list comprising the mapping of error information and the concrete error types, judging means 2022 determines the error types at each level of said tunnel packet which has an error. For storing the error list, the tunnel server may need to be configured with a storing means, which is not shown in the figures for conciseness. Concretely, this judging process can be done in the way below:

by comparing the '5' obtained in the Code field with the Code-field part of the error list, the judging means 2022 can determine that the error type at the first level of the error in said tunnel packet is 'authorization needed'.

by comparing the '1' obtained in the Subcode field with the Subcode-field part of the error list (the error information '5' obtained from the Code field as described above can also be used in conjunction with it), the judging means 2022 can determine that the error type at the second level is 'the name in the payload of the decapsulated IP packet is not in conformity with the selector in SA'.

Thus, the solution provided by the present invention makes it possible to report the error types for a tunnel packet which has an error in detail. And the source termination device can ascertain the error types of a tunnel packet, so as to eliminate the error.

It should be understood that, tunnel server 1 and tunnel server 2 are symmetrical, when host b under the control of tunnel server 2 needs to send, via the secure communication tunnel between tunnel servers 1 and 2, an IP packet belonging to the secure communication thereof to host b, tunnel server 2 becomes the source termination device, and tunnel server 1 becomes the destination termination device. Tunnel server 1 needs to judge whether packet has an error and generate error indicating message for the tunnel packet which has an error, and then report to tunnel server 2. That's to say, a termination device should be able to send ICMP security failure message and parse this kind of messages.

Hereinbefore, explanation is made mainly concerning the circumstance in which the error type at the first level of a tunnel packet which has an error is 'authorization needed'. Other error types at the first level may need not to be fractionized, or be fractionized according to need in practice. Although the embodiments of the present invention have been described above, it should be understood by those skilled in the art that various modifications can be made without departing from the scope and spirit of the scope of the attached claims.

What is claimed:

1. A method, in a termination device of a telecommunication network, for reporting the errors of a packet based on IPSec protocol family, comprising:
   receiving a packet from a source termination device;
   determining if the packet has a network layer error;
   generating an error indicating message if the determining step determines that the packet has the network layer error, the error indicating message indicating at least one network layer error type of the network layer error, the at least one network layer error type selected from at least one of a first network layer error level and a second network layer error level, and the second network layer error level corresponding to a network layer sub-error type of the first network layer error level; and
   sending the error indicating message to said source termination device.

2. The method according to claim 1, wherein
   said error indicating message including at least one error type at the first network layer error level and at least one error type at the second network layer error level, wherein,
   the at least one network layer error type at the first level including one of wrong SPI, verification failed, decapsulation failed, decryption failed, verification needed, and authorization needed; and
   the at least one network layer error type at the second level includes one or more network layer sub-error-type of each network layer error type at the first network layer error level.

3. The method according to claim 1, wherein, said error indicating message is an ICMP security failure message.

4. The method according to claim 3, wherein, the generating step further comprises:
   denoting the at least one network layer error type at the second level with part of the reserved field in ICMP security failure message, or the whole reserved field.

5. A termination device, of a telecommunication network, for reporting the errors of a tunnel packet based on IPSec protocol family, comprising:
   a receiver configured to receive a packet from a source termination device via the Internet;
   a processor configured to determine if the packet has a network layer error;
   a generator configured to generate an error indicating message if the processor determines that the packet has the network layer error, the network layer error indicating message indicating at least one network layer error type of the network layer error, the at least one network layer error type selected from at least one of a first network layer error level and a second network layer error level, and the second network layer error level corresponding to a network layer sub-error type of the first network layer error level;
   a sender configured to send the error indicating message to said source termination device.

6. The termination device according to claim 5, wherein
   said error indicating message including at least one network layer error type at the first network layer error level and at least one network layer error type at the second network layer error level, wherein,
   the at least one network layer error type at the first network layer error level including one of wrong SPI, verification failed, decapsulation failed, decryption failed, verification needed, and authorization needed; and
   the at least one network layer error type at the second network layer error level including one or more network layer sub-error-type of each network layer error type at the first network layer error level.

7. The termination device according to claim 5, wherein said error indicating message is an ICMP security failure message.

8. The termination device according to claim 7, wherein the network layer error type at the second network layer error level is denoted with part of the reserved field in ICMP security failure message, or the whole reserved field.

9. A method, in a termination device of a telecommunication network, for parsing an error indicating message based on IPSec protocol family, comprising:
   receiving the error indicating message in a packet, wherein the error indicating message indicates at least one network layer error type of the error, the at least one network layer error type selected from at least one of a first network layer error level and a network layer second error level, and the second network layer error level corresponding to a network layer sub-error type of the first network layer error level; and
   analyzing to educe, from the error indicating message, the at least one network layer error type at the at least one of the first network layer error level and the network layer second error level in said packet.

10. The method according to claim 9, the analyzing step further comprises:
   obtaining, from the error indicating message, error information denoting the at least one network layer error type at the first network layer error level and the network layer error type at the second network layer error level; and
   determining the at least one network layer error type at the first network layer error level and the second network layer error level in said packet by comparing the error information with a local stored error list.

11. The method according to claim 9, wherein, the error indicating message is an ICMP security failure message.

12. A termination device of a telecommunication network for parsing an error indicating message based on IPSec protocol family, comprising:
   a receiver configured to receive the error indicating message from a remote termination device, wherein the error indicating message indicates at least one network layer error type of the error, the at least one network layer error type selected from at least one of a first network layer error level and a network layer second error level, and the second network layer error level corresponding to a network layer sub-error type of the first error level; and
   an analyzer configure to educe, from the error indicating message at least one of a first network layer error type at the first network layer error level and a second network layer error type at the second network layer error level.

13. The termination device according to claim 12, wherein, the analyzer further comprises:
   a processor configured to obtain from the error indicating message, error information denoting at least one of the first network layer error type at the first network layer error level and the second network layer error type at the second network layer error level; and
   a comparer configured to compare the error information with a local stored error list, to determine the at least one of the first network layer error level and the network layer second error level.

14. The termination device according to claim 12, wherein, the error indicating message is an ICMP security failure message.

* * * * *